(12) United States Patent
Lowery et al.

(10) Patent No.: US 7,163,714 B2
(45) Date of Patent: Jan. 16, 2007

(54) MAGNETIC RECORDING MEDIUM WITH DUAL LAYER FRONT COATING AND METHOD OF MANUFACTURE

(75) Inventors: David C. Lowery, Roberts, WI (US); Ryosuke Isobe, Opelika, AL (US)

(73) Assignees: Imation Corp., Oakdale, MN (US); Quantegy, Inc., Opelika, AL (US)

( * ) Notice: Subject to any disclaimer, the term of this patent is extended or adjusted under 35 U.S.C. 154(b) by 0 days.

(21) Appl. No.: 10/898,136

(22) Filed: Jul. 23, 2004

(65) Prior Publication Data

US 2004/0265642 A1 Dec. 30, 2004

Related U.S. Application Data

(62) Division of application No. 10/263,378, filed on Oct. 1, 2002, now Pat. No. 6,818,298.

(51) Int. Cl.
*B05D 5/12* (2006.01)

(52) U.S. Cl. .............. 427/127; 427/130; 427/131; 427/403; 428/403

(58) Field of Classification Search ........... 427/127, 427/130, 131; 428/403
See application file for complete search history.

(56) References Cited

U.S. PATENT DOCUMENTS

| | | | |
|---|---|---|---|
| 4,692,352 A * | 9/1987 | Huddleston | 427/208.4 |
| 5,876,833 A | 3/1999 | Suzuki et al. | |
| 6,017,605 A * | 1/2000 | Yamazaki et al. | 428/842 |
| 6,030,695 A | 2/2000 | Ohkubo et al. | |
| 6,063,489 A | 5/2000 | Kobayashi et al. | |
| 6,103,365 A | 8/2000 | Ishii et al. | |
| 6,139,982 A | 10/2000 | Bottomley et al. | |
| 6,194,058 B1 | 2/2001 | Isobe et al. | |
| 6,210,775 B1 | 4/2001 | Ejiri et al. | |
| 6,228,461 B1 | 5/2001 | Sueki et al. | |
| 6,251,509 B1 | 6/2001 | Kawamata et al. | |
| 6,265,060 B1 | 7/2001 | Arudi et al. | |
| 6,274,227 B1 | 8/2001 | Oiri et al. | |
| 6,287,668 B1 | 9/2001 | Hayashi et al. | |
| 6,316,077 B1 | 11/2001 | Doushita et al. | |
| 6,319,595 B1 | 11/2001 | Katashima et al. | |
| 6,350,505 B1 | 2/2002 | Hayashi et al. | |
| 6,352,776 B1 | 3/2002 | Hayashi et al. | |
| 2002/0028352 A1 | 3/2002 | Kato et al. | |
| 2002/0045067 A1 | 4/2002 | Masaki et al. | |
| 2002/0102439 A1 | 8/2002 | Kurose et al. | |
| 2002/0122957 A1 | 9/2002 | Hashimoto et al. | |

* cited by examiner

*Primary Examiner*—Alain L. Bashore
(74) *Attorney, Agent, or Firm*—Dicke, Billig & Czaja, PLLC

(57) ABSTRACT

A magnetic recording medium including a non-magnetic substrate, a back coat, a lower layer, and a magnetic upper layer. The substrate defines a front side and back side, with the back coat being formed on the back side. The lower layer is disposed over the front side of the substrate and includes a primary powder material and conductive carbon black material dispersed in a binder. The primary lower layer powder material comprises particles having a coercivity of less than 300 Oe coated with an electroconductive material. The magnetic upper layer is disposed over the lower layer and includes a magnetic powder dispersed in a binder.

5 Claims, 2 Drawing Sheets

MAGNETIC RECORDING MEDIUM WITH DUAL LAYER FRONT COATING AND METHOD OF MANUFACTURE

CROSS-REFERENCE TO RELATED APPLICATIONS

This application is a divisional application of U.S. patent application Ser. No. 10/263,378, filed Oct. 1, 2002, now U.S. Pat. No. 6,818,298, which application is incorporated herein by reference.

BACKGROUND OF THE INVENTION

The present invention relates to a magnetic recording medium. More particularly, it relates to a coated magnetic recording medium, such as a magnetic recording tape, including a magnetic upper layer coated on to a lower support layer, and methods of manufacturing the same.

Magnetic recording media, such as magnetic recording tapes, have continually evolved to satisfy the seemingly endless need for increased recording density or capacity per unit volume. In general terms, magnetic recording media generally comprise a magnetic layer coated onto at least one side of a non-magnetic substrate (e.g., a film for magnetic recording tape applications). With certain designs, the magnetic coating (or "front coating") is formed as a single layer. In an effort to reduce a thickness of this magnetic recording layer, a more recent approach is to form the front coating as a dual layer construction, including a support layer (or "lower layer") on the substrate and a reduced-thickness magnetic layer (or "upper layer") formed directly on the support or lower layer. With this construction, the lower layer is typically non-magnetic or substantially non-magnetic, generally comprised of a non-magnetic powder and a binder. Conversely, the upper layer comprises a magnetic metal particle powder or pigment dispersed in a polymeric binder. Finally, with magnetic recording tape, a backside coating is applied to the other side of the non-magnetic substrate in order to improve the durability, conductivity, and tracking characteristics of the media.

As might be expected, the formulation intricacies associated with the requisite upper layer, lower layer, and back coat, as well as coating of the same to an appropriate substrate, are highly complex, and vary from manufacturer to manufacturer. That is to say, the numerous chemistry and processing variables magnetic recording media invariably result in each magnetic recording media manufacturer having different layer formulations and processing techniques.

Notwithstanding the inherent component and processing variations, certain base materials are commonly employed with many magnetic recording media, including magnetic recording tapes. To this end, magnetic tapes from two different tape manufacturers will often employ several of the same components in one or more of the upper layer, lower layer and back coat. Thus, any improvements to these common material types, amounts or performance characteristics can be universally beneficial. For example, conductive carbon black is typically used as the lower layer conductivity component. Unfortunately, the amount of conductive carbon black normally required to provide requisite conductivity can negatively affect rheology and dispersion quality of the overall lower layer coating.

The conductive carbon black concern described above is but one example of macro-level issues faced by many magnetic recording media manufactures. With reference to specific magnetic recording tape formats, a multitude of other, more exacting formulation and processing issues must be addressed. Thus, a need exists for a magnetic recording medium that exceeds performance requirements and entails broadly applicable improvements.

SUMMARY OF THE INVENTION

One aspect of the present invention relates to a magnetic recording medium including a non-magnetic substrate, a back coat, a lower support layer, and a magnetic upper layer. The substrate defines a front side and back side, with the back coat being formed on the back side. The lower layer is disposed over the front side of the substrate and includes a primary powder material and a conductive carbon black material dispersed in a binder. The lower layer primary powder material consists of particles having a coercivity in the range of 0–300 Oe coated with an electroconductive material. Amounts of the electroconductive coating material and the conductive carbon black are provided based upon the following relationship between a weight percent of the conductive carbon black and a weight percent of the electroconductive coating:

$14-2x \leq y \leq 30-x$, and $8 \leq y$, and $0.5 \leq x \leq 13$, where x=weight percent of conductive carbon black in the lower layer formulation; and y=weight percent of the electroconductive coating material in the lower layer formulation.

The magnetic upper layer is disposed over the lower layer and includes a magnetic powder dispersed in a binder. In one preferred embodiment, the lower layer primary powder is carbon-coated hematite, and a weight ratio of the coated hematite to the conductive carbon black material is 1.5 to 3.5 parts by weight conductive carbon black, based upon 100 parts by weight of the carbon-coated hematite (1.5% to 3.5% conductive carbon black based on weight of the carbon-coated hematite). In another preferred embodiment, the lower layer and upper layer formulations include a stearic acid lubricant that is more than 90 percent pure.

Another aspect of the present invention relates to a magnetic recording medium including a non-magnetic substrate, a back coat, a lower support layer, and a magnetic upper layer. The substrate defines a front side and back side, with the back coat being formed on the back side. The lower layer is disposed over the front side of the substrate and includes a primary powder material and a conductive carbon black material dispersed in a binder. The lower layer primary powder material consists of particles having a coercivity of less than 300 Oe coated with an electroconductive material. With this in mind, the conductive carbon black is provided in an amount of 1 to 5 parts by weight based upon 100 parts by weight of the primary powder material. The magnetic upper layer is disposed over the lower layer and includes a magnetic powder dispersed in a binder.

Yet another aspect of the present invention provides a method for producing a coated magnetic recording medium. The process includes applying a lower layer coating material onto a front side of an elongated, non-magnetic substrate strip. An upper layer coating is then applied onto the coated lower layer coating material. The upper layer and lower layer coating materials are dried to form a medium including a lower support layer and an upper magnetic layer on the substrate. The medium is wound and stored in a below ambient temperature environment. Following cooled storage, the wound medium is calendered.

DETAILED DESCRIPTION OF THE PREFERRED EMBODIMENTS

Figure 1:
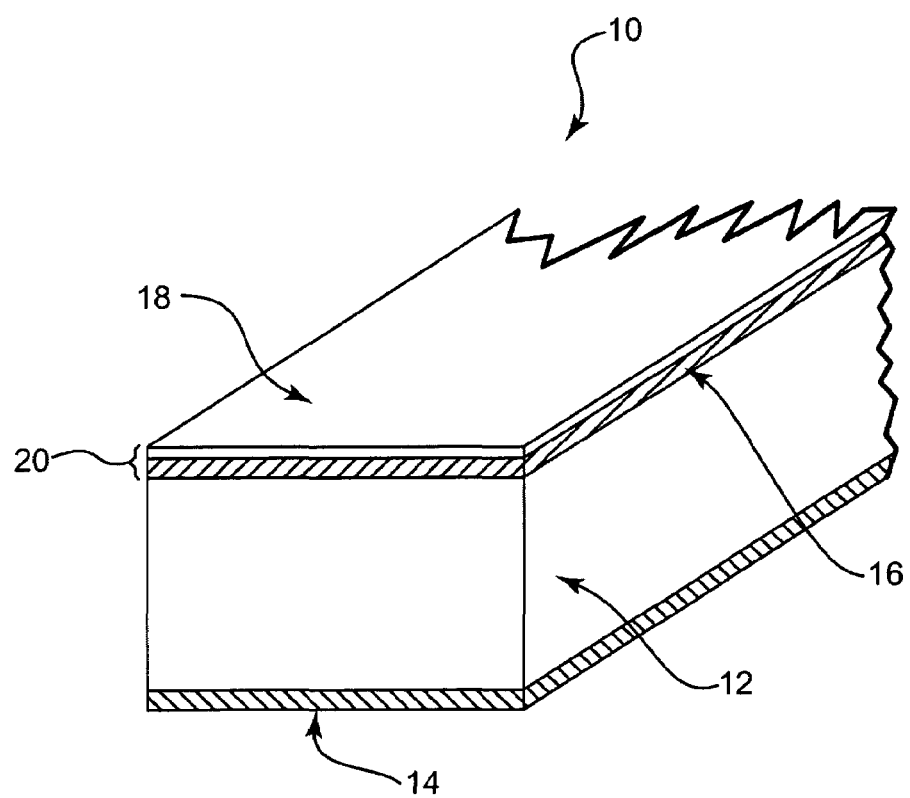
FIG. 1 is a cross-sectional view of a magnetic recording tape in accordance with the present invention.

One exemplary embodiment of a magnetic recording medium 10 in accordance with the present invention is provided in FIG. 1. In a preferred embodiment, the magnetic recording medium 10 is a magnetic recording tape adapted to satisfy DLTtape™ IV standards. Alternatively, however, the present invention includes other types of dual layer media including other magnetic tape formats such as linear tape open (LTO) Ultrium™, magnetic disks, etc. With this in mind, the magnetic recording medium 10 includes a non-magnetic substrate 12, a back coat layer 14, a lower support layer 16, and a magnetic upper layer 18. The lower layer 16 and the upper layer 18 combine to define a front coating 20. The various components are described in greater detail below. In general terms, however, the lower support layer 16 a includes primary powder material consisting of particles having a coercivity of 300 Oe or less coated with an electroconductive material and a conductive carbon black material dispersed in a binder system, whereas the upper layer 18 includes a magnetic metal particle powder or pigment dispersed in a binder. Throughout this specification, the terms "pigment" and "powder" are used interchangeably.

Lower Layer

The lower layer 16 is preferably essentially non-magnetic and includes a non-magnetic or soft magnetic (having a coercivity of less than 300 Oe) powder and a resin binder. By preferably forming the lower layer 16 to be essentially non-magnetic, the electromagnetic characteristics of the upper magnetic layer 18 are not adversely affected. However, if it does not give any adverse affect, the lower layer 16 may contain a small amount of a magnetic powder. In general, and as described in greater detail below, the lower layer 16 preferably further includes an abrasive (or head cleaning agent) as part of the pigment and lubricants.

The pigment or powder incorporated in the lower layer 16 includes a primary pigment material and conductive carbon black. The primary pigment material consists of particles (having a coercivity of less than 300 Oe) coated with an electroconductive material. Other preferred lower layer pigment components are described in greater detail below. In general terms, however, the lower layer 16 of the present invention requires a substantially lesser amount of conductive carbon black than normally employed with available magnetic recording tape formulations. The conductive carbon black material provides a certain level of conductivity so as to prohibit the front coating 20 from charging with static electricity and further improves smoothness of the surface of the upper magnetic layer 18 formed thereon. In this regard, while the particle size of the conductive carbon black material is typically quite small (on the order of 10–50 nm), conventional formulations entail a relatively significant amount of the conductive carbon black component (e.g., on the order of 10 to 30 parts by weight based upon 100 parts by weight of the primary pigment). At these levels, the conductive carbon black material can negatively affect the flow properties or rheology of the lower layer coating. Pursuant to the present invention, however, a significant reduction in the amount of conductive carbon black material in the lower layer 16 is achieved by utilizing particles coated with an electroconductive material as the primary lower layer pigment. This primary lower layer pigment material, in conjunction with the conductive carbon black material, provides requisite electroconductivity to the lower layer 16, while enhancing the flow properties of the lower layer coating due to the reduced amount of conductive carbon black material.

In a preferred embodiment, the primary lower layer pigment material is a carbon-coated hematite material (α-iron oxide). Alternatively, other conventional non-magnetic particles such as titanium dioxide, titanium monoxide, alumina, tin oxide, titanium carbide, silicon carbide, silicon dioxide, silicon nitride, boron nitride, etc., or soft magnetic particles having a coercivity of less than 300 Oe, can be provided in a form coated with carbon, tin, or other electroconductive material and employed as the primary lower layer pigment. The average particle size of the primary lower layer pigment represents a compromise between two competing considerations. If the average particle size is too large, the surface smoothness of the lower layer 16 deteriorates, and the surface roughness of the upper layer 18 is unacceptable. Conversely, when the average particle size is too small the dispersability or dispersion stability of the primary pigment decreases, and the surface smoothness of the lower layer 16 deteriorates.

The conductive carbon black material is preferably of a conventional type available from various known commercial sources. In one preferred embodiment, the conductive carbon black material has an average particle size of less than 20 nm, more preferably about 15 nm.

In one preferred embodiment, amounts of the electroconductive coating material and the conductive carbon black are provided based upon a preferred relationship between a weight percent of the conductive carbon black and a weight percent of the electroconductive coating. More particularly, in accordance with this one embodiment, the relationship is preferably as follows:

$14-2x \leq y \leq 30-x$, and $8 \leq y$, and $0.5 \leq x \leq 13$, where x=weight percent of conductive carbon black in the lower layer formulation; and y=weight percent of the electroconductive coating material in the lower layer formulation.

Figure 2:
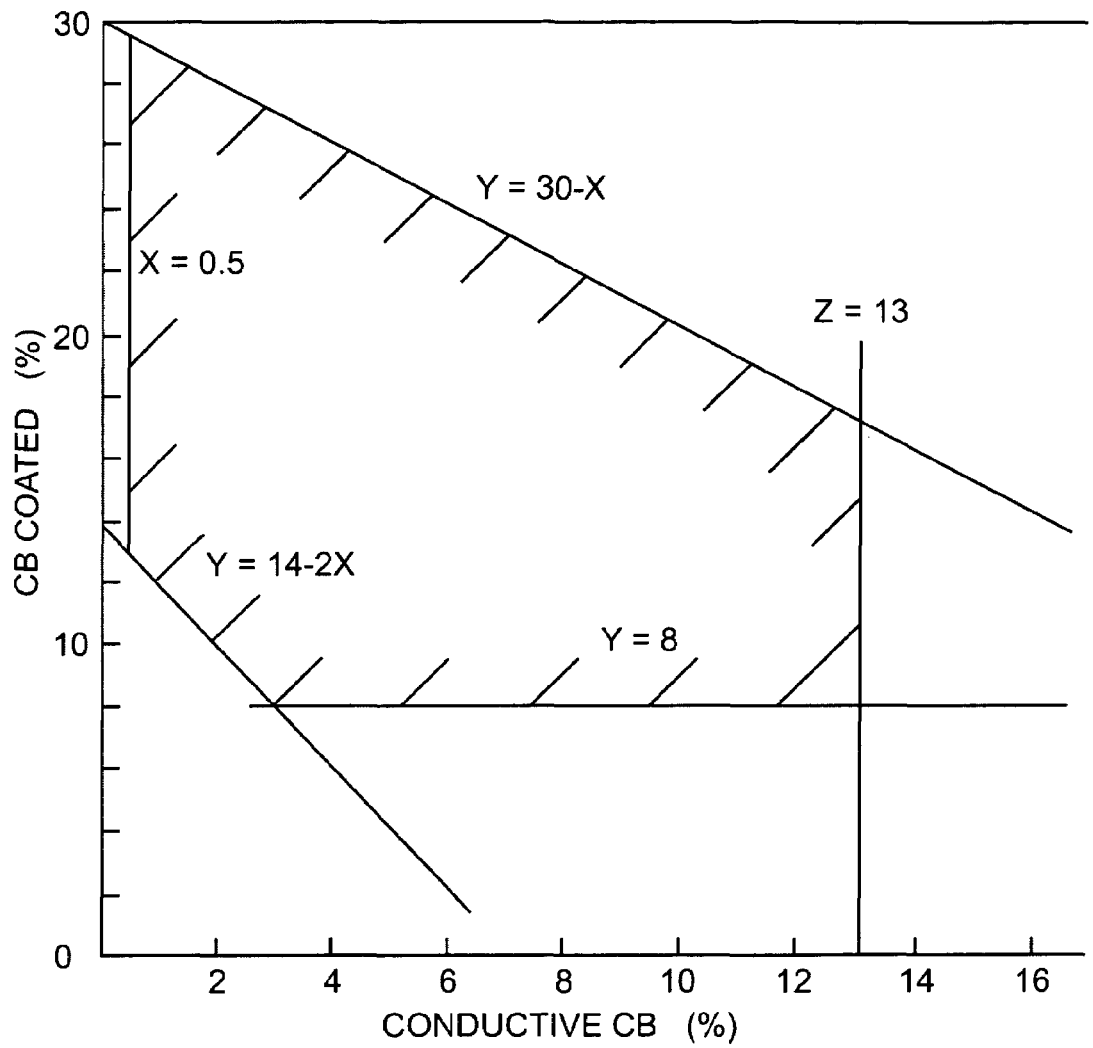
FIG. 2 is a graph illustrating a relationship between conductive carbon black and electroconductive coating material in the lower layer.

This first preferred relationship is expressed graphically in FIG. 2. It has surprisingly been found that, with a preferred carbon black coating material (e.g., carbon-coated hematite), dual layer magnetic recording media incorporating a lower layer formulation corresponding to the above conductive carbon black and carbon coating material weight percents exhibit acceptable resistivities of not more than $1 \times 10^8$ ohm/cm$^2$.

In another preferred embodiment, the conductive carbon black is added in amounts of 1 to 5 parts by weight, more preferably 1.5 to 3.5 parts by weight, based on 100 parts by weight of the primary lower layer powder. The total amount of conductive carbon black and electroconductive coating material in the lower layer is preferably sufficient to provide a resistivity at or below $1 \times 10^8$ ohm/cm$^2$.

The lower layer 16 can include additional pigment components such as an abrasive or head cleaning agent (HCA). One preferred HCA component is aluminum oxide. Further, other abrasive grains such as silica, $ZrO_2$, $Cr_2O_3$, etc., can be employed.

The binder system or resin associated with the lower layer 16 preferably incorporates conventional binder resins, such as a thermoplastic resin, in conjunction with other resin components such as binders and surfactants used to disperse the HCA, a surfactant (or wetting agent), and one or more hardeners. In one preferred embodiment, the binder system of the lower layer 16 includes a combination of a primary polyurethane resin and a vinyl chloride resin. Examples of polyurethanes include polyester-polyurethane, polyester-polyurethane, polycarbonate-polyurethane, polyester-polycarbonate-polyurethane, and polycaprolactone-polyurethane. Other acceptable vinyl chloride resins such as vinyl chloride-vinyl acetate copolymer, vinyl chloride-vinyl acetate-vinyl alcohol copolymer, and vinyl chloride-vinyl acetate-maleic anhydride can also be employed with the primary polyurethane binder. Further, resins such as bisphenyl-A-epoxy, styrene-acrylonitrile, and nitrocellulose may also be acceptable.

In a preferred embodiment, the primary polyurethane binder is incorporated into the lower layer 16 in an amount of 4 to 10 parts by weight, and preferably 6 to 8 parts by weight, based on 100 parts by weight of the electroconductive primary lower layer pigment. In a preferred embodiment, the vinyl chloride binder is incorporated into the lower layer 16 in an amount of 7 to 15 parts by weight, and preferably 10 to 12 parts by weight, based on 100 parts by weight of the primary lower layer pigment.

The binder system further preferably includes an HCA binder used to disperse the selected HCA material, such as a polyurethane paste binder (in conjunction with a pre-dispersed or paste HCA). Alternatively, other HCA binders compatible with the selected HCA format (e.g., powder HCA) are acceptable.

The binder system further preferably includes a conventional surfactant or wetting agent. Known surfactants, such as phenylphosphonic acid (PPA), 4-nitrobenzoic acid, and various other adducts of sulfuric, sulfonic, phosphoric, phosphonic, and carboxylic acids are acceptable.

The binder system further preferably contains a hardening agent such as isocyanate or polyisocyante. In a preferred embodiment, the hardener component is incorporated into the lower layer in an amount of 2 to 5 parts by weight, and preferably 3 to 4 parts by weight, based on 100 parts by weight of the primary lower layer pigment.

The lower layer 16 may further contain one or more lubricants such as a fatty acid and/or a fatty acid ester. The incorporated lubricant(s) exist throughout the front coating 20 and (importantly) at the surface of the upper layer 18. The lubricant(s) reduces friction to maintain smooth contact with low drag, and protects the media 10 surface from wear. Thus, the lubricant(s) provided in both the upper and lower layer 16, 18 are preferably selected and formulated in combination. By way of background, conventional magnetic recording tape formulations employ technical grade acids and acids esters as the lubricant(s). It has surprisingly been found that these technical grade lubricant materials contribute to formation of sticky debris in the front coating 20 due to migration of impurities to the front coating 20 surface. This debris, in turn, can lead to poor tape performance due to contamination of recording heads and other media transport surfaces, interference with lubricity of the medium in transport causing excessive frictional drag, and media wear.

One aspect of the present invention solves the above problems by incorporating fatty acids and/or fatty acid esters that are at least 90 percent pure as lubricants. For example, in a most preferred embodiment, the lower layer 16 includes stearic acid that is at least 90 percent pure as a fatty acid. Unlike conventional techniques in which technical grade acids and/or acid esters are employed for the lubricant component, incorporation of high purity lubricant materials with the present invention ensures robust performance of the resultant medium 10. Alternatively, other acceptable fatty acids include myristic acid, palmitic acid, oleic acid, etc., and their mixtures. The lower layer formulation can further include a fatty acid ester such as butyl stearate, isopropyl stearate, butyl oleate, butyl palmitate, butylmyristate, hexadecyl stearate, oleyl oleate, etc., and their mixtures. The fatty acids and fatty acid esters may be employed singly or in combination, and are not limited to at least 90 percent purity grades. In a most preferred embodiment in which high purity stearic acid (at least 90 percent pure) and a fatty acid ester are employed, the lubricant is incorporated into the lower layer 16 in an amount of 1–10 parts by weight, and preferably 1–5 parts by weight, based on 100 parts by weight parts of the electroconductive-coated primary lower layer pigment. More particularly, the stearic acid (at least 90 percent pure) is added in amounts of 0.5 to 7 parts by weight, preferably 0.5 to 3 parts by weight, based on 100 parts by weight of the primary lower layer pigment; the fatty acid ester is added in amounts of 0.5 to 3 parts by weight, based upon 100 parts by weight of the electroconductive-coated primary lower layer pigment.

As described in greater detail below, the lower layer 16 is coated to the substrate 12 so that the lower layer 14 is initially prepared as a coating material that includes the above-described components and a solvent. With this in mind, the solvent associated with the lower layer coating material preferably includes 5–50% cyclohexanone (CHO), 30–90% methyl ethyl ketone (MEK), and 5–90% toluene (Tol), more preferably 5–40% CHO, 30–70% MEK, and 10–60% Tol. Alternatively, other ratios can be employed. Even further, other acceptable solvents or solvent combinations including, for example, xylene, tetrahydrofuran, and methyl amyl ketone, are acceptable.

Upper Layer

As previously described, the upper layer 18 generally consists of a magnetic metal particle pigment or powder dispersed in an appropriate binder or resin system, and can further contain other components such as a lubricant.

The magnetic metal particle pigment preferably consists of a primary magnetic metal particle pigment in conjunction with a large, soft particle powder (i.e., having a Moh's hardness of less than 5 and average particle size of 50–500 nm, for example large particle carbon black), along with other additives such as an abrasive (HCA). The primary magnetic metal particle pigment is preferably a ferromagnetic powder including, for example, magnetic iron oxide (g-FeO$_x$) and Co-containing (coated, modified, or coated) g-FeO$_x$ (x=1.33–1.50)), ferromagnetic powder ($\alpha$-Fe, alloys of iron with Co or Ni), etc. In order to improve the required characteristics, the preferred ferromagnetic powder contains various additives, such as semimetal or non-metal elements and their salts or oxides such as Al, Co, Y, Ca, Mg, Mn, Na, etc. The selected ferromagnetic powder may be treated with various auxiliary agents before it is dispersed in the binder system, resulting in the primary magnetic metal particle pigment.

In addition to the preferred primary magnetic metal particle pigment described above, the metal particle pigment of the upper layer 18 further includes a large particle carbon material of a size that ensures a small kinetic friction coefficient, good running endurance, and surface smoothness. More preferably, the upper layer pigment includes a large particle carbon material that includes spherical carbon particles. The large particle carbon materials have a particle size on the order of 50–500 nm, more preferably 100–350 nm. Spherical large carbon particle materials are known and commercially available. The large particle carbon materials can include various additives to improve performance such as sulfur.

An additional additive associated with the upper layer pigment is an abrasive or head cleaning agent (HCA) component, preferably aluminum oxide and is similar to that described above with respect to the lower layer 16.

The binder system associated with the upper layer 18 can be similar to the binder resin previously described with respect to the lower layer 16, including the HCA binder, the surfactant and the isocyanate hardener. In one preferred embodiment, the binder system of the upper layer 18 includes a primary polyurethane binder and a vinyl chloride binder. The primary polyurethane binder is contained in an amount of 3 to 20 parts by weight, preferably 4 to 12 parts by weight, based on 100 parts by weight of the primary magnetic metal particle powder. Further, the preferred vinyl chloride binder is contained in an amount of 5 to 20 parts by weight, preferably 8 to 15 parts by weight, based upon 100 parts by weight of the primary magnetic metal particle powder. Where the binder system further includes an HCA binder, a surfactant, and isocyanate hardener, a preferred weight ratio of the resin to the primary metal particle powder is preferably from 4:1 to 5:1.

The upper layer 18 preferably further includes a lubricant such as a fatty acid and/or fatty acid ester. With reference to the discussion above relating to lower layer 16 lubricants, the fatty acid lubricant component of the upper layer 18 is preferably of a high purity (at least 90 percent pure). In one preferred embodiment, the lubricant employed with the upper layer 18 includes at least 90 percent pure stearic acid as the fatty acid. As previously described with respect to the lubricants associated with the lower layer 16, the at least 90 percent pure fatty acid lubricant component is preferred in the upper layer 18 formulation to ensure uncompromised lubrication and the absence of recording head contamination.

In a preferred embodiment, the high purity stearic acid is present in an amount from 0.2 to 5.0 parts by weight, based upon 100 parts by weight of the primary magnetic metal particle powder, and a fatty acid ester component is preferably present in an amount from 0.5 to 2 parts by weight, more preferably 0.5 to 1.5 parts by weight, per 100 parts by weight of the primary magnetic metal particle powder. As previously described, however, other lubricant components and/or amounts are also acceptable.

Finally, as with the lower layer 16, the upper layer 18 is preferably formulated as a coating material via a solvent, with this coating material being coated onto the lower layer 16. With this in mind, in one preferred embodiment, a solvent consisting of 5–50% CHO, 30–90% MEK, and 5–40% Tol, more preferably, 5%–40% CHO, 40%–60% MEK, and 5%–40% Tol, it being understood that a wide variety of other solvents or combination solvents are available.

Back Coat

The back coat 14 is generally of a type conventionally employed, and thus primarily consists of a soft (i.e., Moh's hardness<5) non-magnetic particle material such as carbon black or silicone dioxide particles. In one preferred embodiment, the back coat layer 14 comprises a combination of two kinds of carbon blacks, including a primary, small carbon black component and a secondary, large texture carbon black component, in combination with appropriate binder resins. The primary, small carbon component preferably has an average particle size on the order of 10–25 nm, whereas the secondary, large carbon component preferably has an average particle size on the order of 50–300 nm.

As is known in the art, back coat pigments dispersed as inks with appropriate binders, surfactant, ancillary particles, and solvents are typically purchased from a designated supplier. In a preferred embodiment, the back coat binder includes at least one of a polyurethane, phenoxy resin, and nitrocellulose added in an amount appropriate to modify coating stiffness as desired.

Substrate

The substrate 12 can be any conventional non-magnetic substrate useful as a magnetic recording medium support. Exemplary substrate materials useful for magnetic recording tapes include polyesters such as polyethylene terephthalate, polyethylene naphthalate, a mixture of polyethylene terephthalate and polyethylene naphthalate; polyolefins (e.g., polypropylene); cellulose derivatives; polyamides; and polyimides. Preferably, polyethylene terephthalate (PET) is employed.

Processing

In general terms, the method for producing the magnetic recording medium 10 includes preparing an upper layer coating material, a lower layer coating material, and a back coat coating material. The coatings are then formed on the substrate 12, with the back coat coating material being applied to a back side of the substrate 12, the lower layer coating material being applied to a front side of the substrate 12, and the upper layer coating material being applied onto the coated lower layer coating material. Once dried, the lower layer 16 and the upper layer 18 are formed and define a magnetic front coating. In a preferred embodiment, the lower layer coating material and the upper layer coating material are applied pursuant to a wet-on-wet process in which the magnetic upper layer coating material is applied onto the lower layer coating material while the lower layer coating material is still wet. Preferably, a die coating technique and/or coaters is employed to conduct the wet-on-wet processing. Alternatively, other known coating techniques, such as slide or slot coating, gravure coating, etc., can be employed.

The coating materials of the upper layer, lower layer, and back coat according to the present invention are prepared by dispersing the corresponding powders or pigments and the binders in a solvent. For example, with respect to the coating material for the upper layer 18, the primary metal particle powder or pigment and the large particle carbon materials are placed in a high solids mixing device along with certain of the resins (i.e., polyurethane binder, vinyl chloride binder, and surfactant) and the solvent and processed for 1–4 hours. The resulting material is processed in a high-speed impeller dissolver for approximately 30–90 minutes, along with additional amounts of the solvent. Following this letdown processing, the resulting composition is subjected to a sandmilling or polishing operation. Subsequently, the HCA and related binder components are added, and the composition left standing for approximately 30–90 minutes. Following this letdown procedure, the composition is processed through a filtration operation, and then stored in a mixing tank at which the hardener component and lubricants are added. The resulting upper layer coating material is then ready for coating.

Preparation of the lower layer coating material preferably entails a similar process, including high solids mixing of the primary electroconductive-coated primary lower layer pigment, the conductive carbon black material, the binder resins including the preferred primary polyurethane binder and vinyl chloride binder, and a solvent for approximately 2–4 hours.

Finally, preparation of the back coat coating material preferably entails mixing the various components, including a solvent, in a planetary mixer or similar device, and then subjecting the dispersion to a one pass sandmilling operation. Subsequently, the material is processed through a filtration operation in which the material is passed through a number of filters. In one preferred embodiment six filters of varying grades are utilized.

Following preparation, the various coating materials are then applied to the substrate 12; with the back coat being first applied and dried. Once again, the preferred coating technique entails a die coating technique and/or coaters that applies the lower layer coating material and then the upper layer coating material prior to drying of the lower layer coating material. The magnetic particles of the upper layer oriented in the longitudinal direction by an orientation device, and the upper and lower layers dried. Subsequently, the resultant web is wound and calendered. In this regard, it may be necessary to temporarily store and/or transport the wound web prior to calendering. Under these circumstances, the wound web is preferably wrapped in aluminum foil and placed in a plastic bag. The packaged, wound web is maintained (e.g., stored and/or transported) in a cooled or below ambient temperature environment The cooled environment preferably has a temperature in the range of −80° to 20° C., more preferably −20° to 20° C. It has been found that in a cooled environment, the wound web can be stored for several days without negatively impacting subsequent calendering. The wound media is then cured by placement in an oven at a temperature in the range of 50°–70° C. for 0.5 to 5 days. Finally, standard processing is employed, including slitting and burnishing.

EXAMPLES AND COMPARISONS

Dual layer magnetic recording tape samples were prepared using upper layer and back coat formulations as previously described. The lower layer formulation was similar for each sample, in accordance with previous descriptions, except that the amount of electroconductive coating material and conductive carbon black were varied, as were the conductive carbon black material particle size. Carbon-coated hematite was used as the primary lower layer powder. For each sample, the upper layer was coated to a thickness of 0.25 microns and the lower layer was coated to a thickness of 2.0 microns. The resistivity of each sample was tested, with the results appearing in Table 1.

TABLE 1

| Carbon Coating Level On Hematite (% of hematite weight) | Carbon Particle Level (% of LL carbon-coated hematite powder weight) | Carbon Particle Average Diameter (nm) | Overall LL Carbon-Coated Hematite Powder Level (% of total composition weight) | Resistivity (ohms/cm$^2$) |
|---|---|---|---|---|
| 13 | 0 | na | 76.7 | 2.0E+11 |
| 13 | 0 | na | 76.7 | 1.0E+12 |
| 13 | 2 | 15 | 75.6 | 3.0E+08 |
| 13 | 0 | na | 76.7 | 1.0E+11 |
| 20 | 0 | na | 76.7 | 2.0E+11 |
| 13 | 8 | 21 | 72.3 | 7.5E+07 |
| 13 | 12 | 21 | 69.1 | 2.2E+06 |
| 20 | 5 | 21 | 73.9 | 1.7E+06 |
| 0 | 25 | 21 | 62.4 | 3.0E+10 |
| 13 | 12 | 21 | 70.3 | 1.9E+06 |
| 13 | 2.5 | 15 | 75.3 | 1.0E+07 |
| 13 | 12 | 21 | 71.1 | 1.5E+06 |
| 13 | 2.5 | 15 | 75.3 | 9.7E+06 |

Although the present invention has been described with reference to preferred embodiments, workers skilled in the art will recognize that changes can be made in form and detail without departing from the spirit and scope of the present invention.

What is claimed is:

1. A process for producing a magnetic recording medium, the process comprising:
    applying a lower layer coating material onto a front face of an elongated non-magnetic substrate strip;
    applying a magnetic upper layer coating material onto the coated lower layer coating material;
    drying the lower layer and upper layer coating materials to form the medium that includes a lower support layer and an upper magnetic layer;
    winding the medium;
    storing the wound medium in an environment below ambient temperature; and
    calendering the wound medium.

2. The process of claim 1, wherein the lower layer coating material includes a carbon-coated hematite primary powder.

3. The process of claim 1, wherein the below ambient temperature environment has a temperature in the range of −80° to 20° C.

4. The process of claim 1, further comprising:
    curing the calendered medium at a temperature in the range of 50°–70° C.

5. The process of claim 1, wherein the calendered medium is cured for 0.5 to 5 days.

* * * * *